United States Patent
Singer

(10) Patent No.: US 7,566,021 B2
(45) Date of Patent: Jul. 28, 2009

(54) BELT SHAFT BLOCKING DEVICE

(75) Inventor: Klaus-Peter Singer, Hamburg (DE)

(73) Assignee: Autoliv Development AB (SE)

( * ) Notice: Subject to any disclaimer, the term of this patent is extended or adjusted under 35 U.S.C. 154(b) by 325 days.

(21) Appl. No.: 10/544,828

(22) PCT Filed: Jan. 29, 2004

(86) PCT No.: PCT/EP2004/000761

§ 371 (c)(1),
(2), (4) Date: Aug. 5, 2005

(87) PCT Pub. No.: WO2004/069614

PCT Pub. Date: Aug. 19, 2004

(65) Prior Publication Data

US 2006/0145462 A1    Jul. 6, 2006

(30) Foreign Application Priority Data

Feb. 6, 2003    (DE) .................................. 103 04 943

(51) Int. Cl.
*B60R 22/00* (2006.01)
*B60R 22/46* (2006.01)
*B65H 75/48* (2006.01)

(52) U.S. Cl. ............... 242/382.2; 242/374; 242/379.2; 280/806; 297/476; 297/479

(58) Field of Classification Search ............. 242/379.2, 242/382.2, 374, 322, 389, 382.6; 280/806; 297/476, 479; 405/105
See application file for complete search history.

(56) References Cited

U.S. PATENT DOCUMENTS

| 3,294,446 | A | * | 12/1966 | Fontaine | ................... 297/477 |
| 4,346,858 | A | * | 8/1982 | Hollowell et al. | ........... 242/372 |
| 4,508,289 | A | * | 4/1985 | Singer et al. | ............. 242/383.2 |
| 4,619,418 | A | * | 10/1986 | Butenop | ................... 242/382.6 |
| 5,522,564 | A | * | 6/1996 | Schmidt et al. | ............. 242/374 |
| 5,743,481 | A | * | 4/1998 | Baker | ......................... 242/374 |

FOREIGN PATENT DOCUMENTS

| DE |   3233969 A | * | 3/1984 |
| DE | 34 11 067 |   | 10/1985 |
| DE |   4331027 |   | 3/1995 |
| DE |  298 20 223 |   | 11/1998 |

* cited by examiner

*Primary Examiner*—Peter M Cuomo
*Assistant Examiner*—Stefan Kruer
(74) *Attorney, Agent, or Firm*—Robert W. Becker; Robert Becker & Associates

(57) ABSTRACT

A restraint system for a motor vehicle includes a safety belt, an end of which can be attached by means of an end pre-load tensioning device to the vehicle body. The end pre-load tensioning device includes a seat belt retractor that takes up the end of the seat belt and a tensioning device connected thereto for the belt shaft of the seat belt retractor. The belt shaft is formed as a hollow shaft, and a blocking element blocks the belt shaft that is released in the event of an accident.

10 Claims, 5 Drawing Sheets

BELT SHAFT BLOCKING DEVICE

This specification for the instant application should be granted the priority date of Feb. 6, 2003, the filing date of the corresponding German patent application 103 04 943.6 as well as the priority date of Jan. 29, 2004, the filing date of the corresponding International patent application PCT/EP2004/00761.

BACKGROUND OF THE INVENTION

The present invention relates to a restraint system for a motor vehicle, comprising a safety belt, an end of which can be attached by means of an end or end fitting tensioning device to the vehicle body, whereby the end tensioning device comprises a seat belt retractor that takes up the end of the seat belt and a tensioning device connected thereto for the belt shaft of the seat belt retractor, with a belt shaft formed as a hollow shaft and a blocking element for blocking the belt shaft that is released in the event of an accident.

A restraint system with the above features is disclosed in DE 43 31 027 A1 or DE 195 45 898 C2, in which the belt shaft is rotatable in connection to the tensioning movement during impingement of a torsion bar integrated in it in the belt pull-out direction, and in the sense of a force limitation, a known amount is again released to the belt band. However, it is desirable, especially with further safety components integrated in the restraint system or cooperating therewith, in connection with the tensioning movement to ensure that the force connection for the strapped-in occupants is as fast as possible and without subsequent belt slack resulting after the tensioning process.

The invention therefore is based on the object of providing a restraint system with these types of features and an end tensioning device for a quick blocking of the belt shaft without further belt release in connection with the belt tensioning that also has a simple structure.

SUMMARY OF THE INVENTION

The invention contemplates in its basic concept that the shaft body of the actual belt shaft extends through the housing leg of the seat belt retractor housing and has a recess in the plane of a housing leg, that in the interior of the hollow shaft body, a blocking element is pivotably disposed, which projects with at least one tooth through a recess over the outer circumference of the shaft body and is prestressed by a spring element fixed in the interior of the shaft body that is engaged in a toothing formed on an associated housing leg of the seat belt retractor housing. The blocking element is formed so that upon rotation of the belt shaft in the tensioning direction, it ratchets away over the toothing and during rotation of the belt shaft in the belt pull-out direction that takes place after completion of the tensioning movement, it causes the immediate blocking of the belt shaft. Since the blocking element, including the spring element that prestresses it, is premounted in the interior of the belt shaft formed as a hollow shaft, a simple, constructive structure of the blocking device is provided for the belt shaft in an advantageous manner.

A belt shaft of a seat belt retractor formed as a hollow shaft is disclosed in DE 298 10 223 U1, on whose lateral ends, respectively, a collar with a toothing formed thereon is disposed as the blocking contour in a one-piece embodiment.

In addition, a blocking element that can be pivoted radially outward from the shaft contour of a belt shaft is disclosed in DE 34 11 067 A1.

According to one embodiment of the invention, it is provided that the blocking element supported with a bearing shoulder in a through hole of the shaft body is braced in the engaged state with the toothing of the seat belt retractor housing on an end region of the recess formed as a shaft nose, whereby the recess in the circumferential direction has an extension such that the blocking element can plunge with its tooth into the recess upon over-ratcheting of the toothing of the seat belt retractor housing.

According to one embodiment of the invention, it is provided that the blocking element surrounds the shaft nose with a pocket, that the shaft nose moves into the pocket under a load, and the movement space is defined between the blocking element and the shaft body.

For fixing of the blocking element to the shaft body, in addition to the rotatable bearing of the blocking element, it is provided that the shaft nose has a curved region bent inward into the interior of the shaft body. For improved support of the belt shaft during its blocking, it can be provided that the curved region of the shaft nose is formed so that it can be bent under a load into the interior of the shaft body. With regard to a minimal radial displacement of the belt shaft upon bending in of the curved region, it is provided that on the outer circumference of the shaft body, a blocking contour oriented for engagement of the toothing of the seat belt retractor housing is formed directly in the shaft body. With such a structure, the blocking of the belt shaft via the blocking element is supported by engagement of the toothing of the seat belt retractor housing in the blocking contour formed on the shaft body.

A plurality of blocking contours are expediently distributed over the circumference of the shaft body, whereby according to exemplary embodiments of the invention, the respective blocking contour is formed as a recess in the shaft body or as a blocking bead or pleat pressed into the shaft body.

According to one embodiment of the invention, it is provided that the blocking element is prestressed by a plate spring fixed in the interior of the shaft body that engages with the toothing of the seat belt retractor housing, whereby the plate spring can be fixed in an appropriate manner in a holder part placed in the interior of the shaft body. In this connection, it can be provided that the holding part can be fixed in at least one recess formed in the shaft body.

By means of the fixing of the plate spring, the holder part can function to axially guide the blocking element during its ratcheting movement, whereby the holder part can be U-shaped, so that it can encompass the blocking element between its U-legs.

For symmetrical blocking of the belt shaft in the seat belt retractor housing, it can be provided that, in the plane of the housing leg supporting the belt shaft in the shaft body, a respective blocking element is formed and on the housing leg, respectively, a toothing is formed.

With regard to the structure of the shaft body, it can be provided that the shaft body can comprise a shaft jacket formed as a flat precut part and formed in a roller, whereby the shaft jacket can comprise a thin steel sheet.

BRIEF DESCRIPTION OF THE DRAWINGS

In the drawings, one embodiment of the present invention is provided, which will be described next in greater detail. In the figures.

DESCRIPTION OF SPECIFIC EMBODIMENTS

Figure 1:
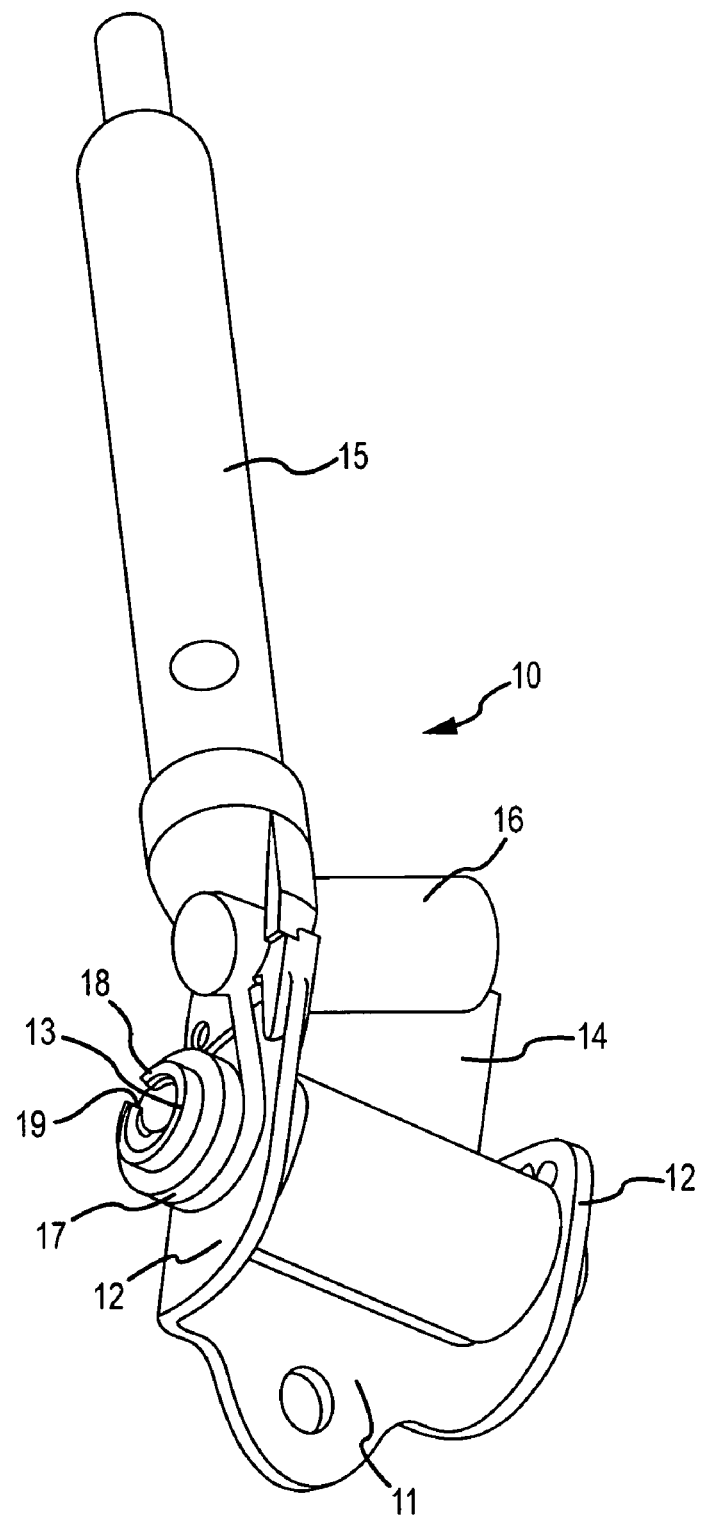
FIG. 1 shows an end tensioning device in a general view.

The end tensioning device 10 shown first in FIG. 1 comprises a U-shaped seat belt retractor housing 11, in whose housing legs 12, a belt shaft 13 is supported, on which a belt band or strap 14 is wound. A tensioning device 15 is connected to one housing leg 12, comprising a tensioning tube, to which a propellant charge 16 is connected. The connections between the tensioning device 15 and the belt shaft 13 takes place via a tensioning cable 17, which is coiled on a shaft appendage 18 of the belt shaft 13 and is attached with its ends in a cable restoring device 19 of the belt shaft 13.

Figure 2:
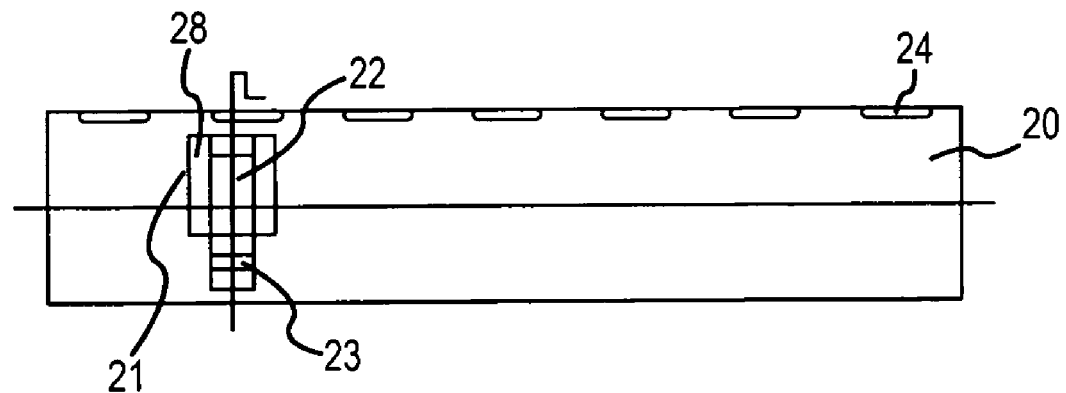
FIG. 2 shows the shaft body of the belt shaft in a plan view.

The shaft body 20 shown in FIG. 2 in an extracted representation has a recess 21 disposed at a position which comes to rest in the plane of one housing leg 12 near the belt shaft 13 placed in the seat belt retractor housing 11. A blocking element 22 arranged in the interior of the shaft body 20 projects with its teeth 23 through the recess 21. In addition, further recesses are provided on the outer circumference of the shaft body 20, which can be used in a manner to be described.

Figure 3:
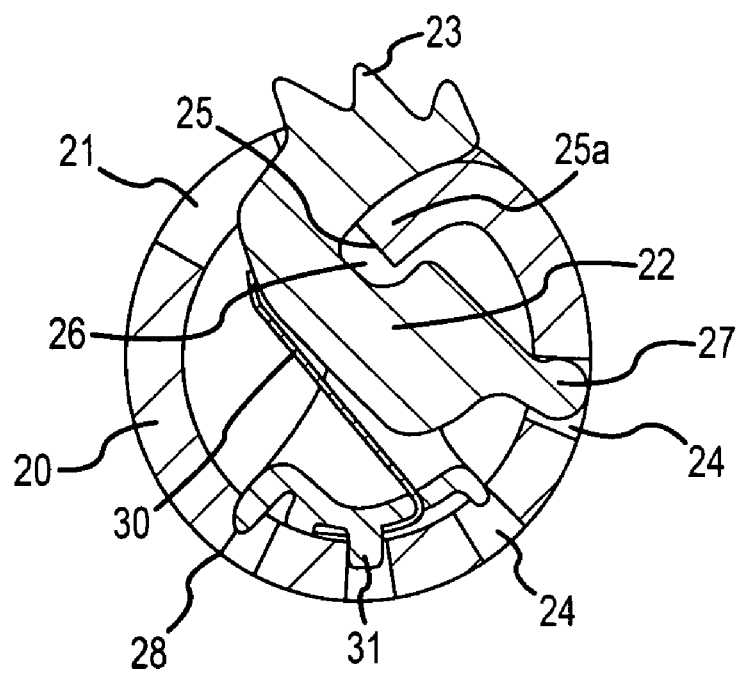
FIG. 3 shows the shaft body according to FIG. 2 including the blocking device in a sectional view.

As can be seen from FIG. 3, the blocking element 22 is supported with a bearing shoulder 27 in one of the recesses 24 of the shaft body, such that the blocking element 22 can be pivoted inward around this bearing point and can plunge into the recess 21. The blocking element 22 surrounds an edge region of the recess 21 formed as a shaft nose 25 with a pocket 26, whereby the shaft nose 25 has a curved region 25a bent into the interior of the shaft body 20.

In addition, in the interior of the shaft body 20, a holder part 28 for a plate spring is provided, whereby the plate spring 30 contacts the outer circumference of the blocking element 22, so that the plate spring 30 prestresses the blocking element in its position outside of the shaft body 20.

Figure 4:
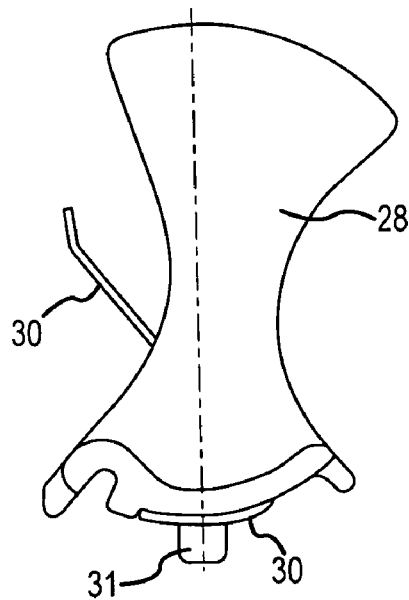
FIG. 4 shows the holder part for the plate spring in a side view.
Figure 5:
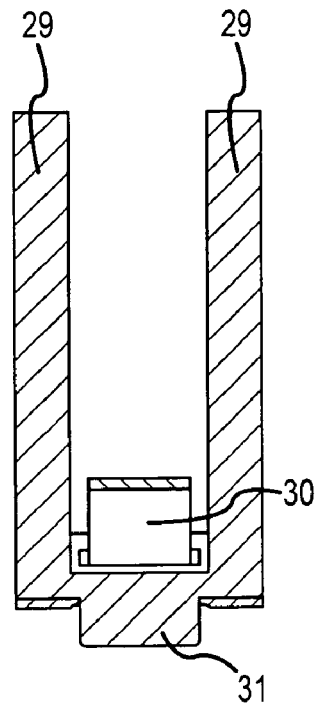
FIG. 5 shows the holder part according to FIG. 4 in a sectional view.
Figure 6:
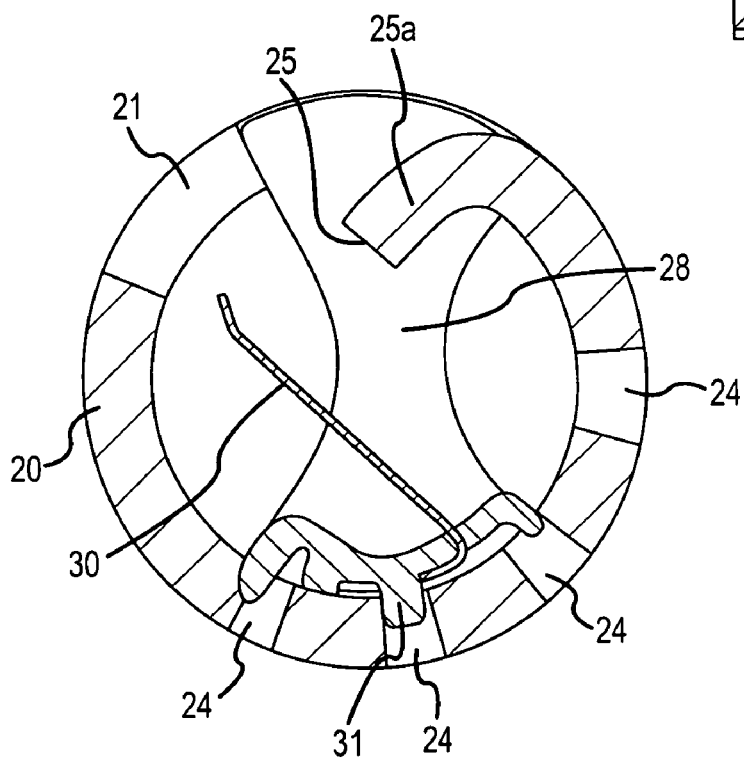
FIG. 6 shows the shaft body with a premounted holder part in a sectional view.

As can be seen in detail from FIGS. 4 through 6, the holder part 28 is U-shaped with U-legs 29, whereby the U-legs 29 accommodate the blocking element 22 between them in the assembled state and axially guide it during its radial movement. The holder part 28 can be fixed via holding projections 31 likewise into recesses 24 of the shaft body 20. In this connection, FIG. 6 shows especially well the shaft body 20 with the holder part 28 mounted therein.

Figure 7:
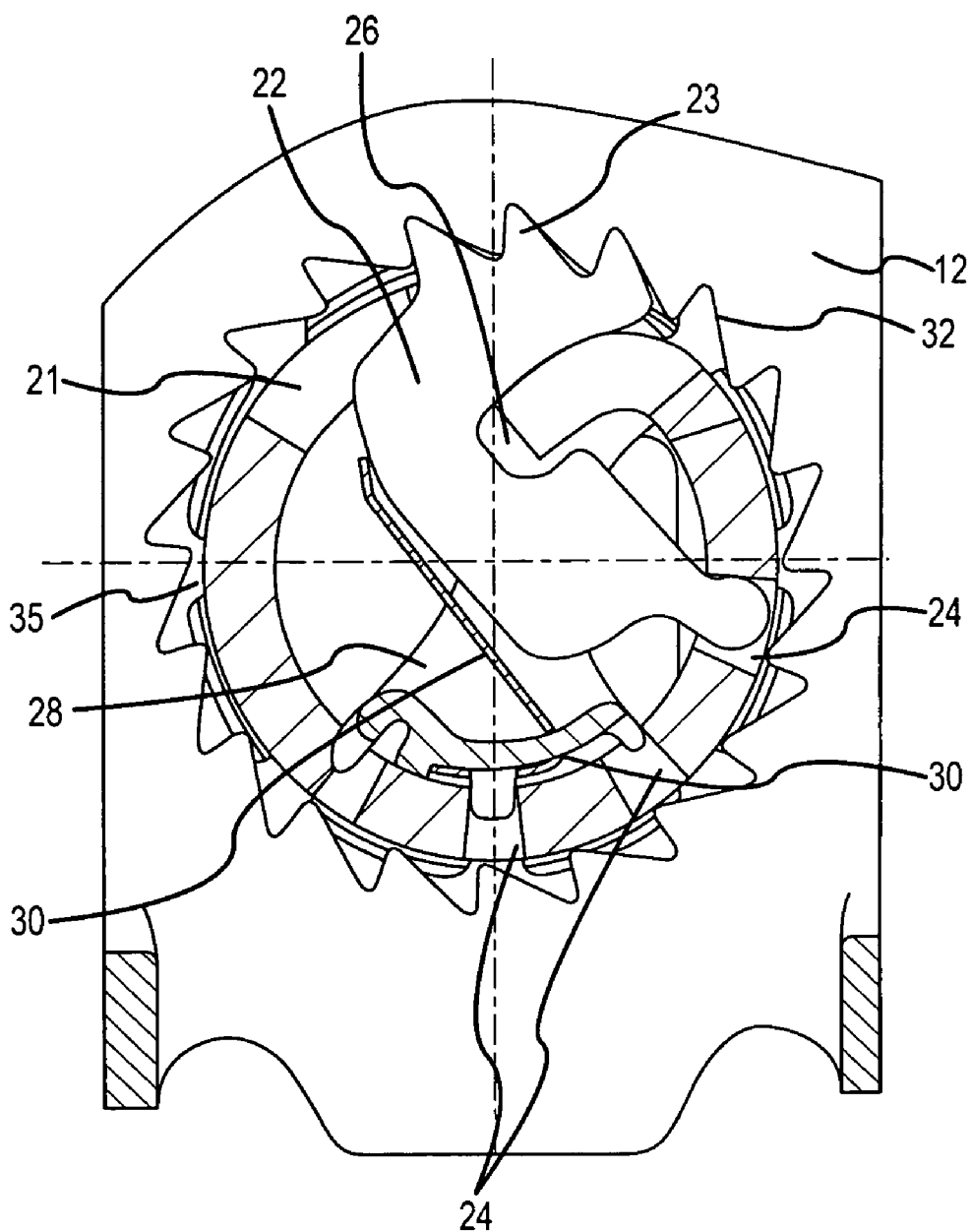
FIG. 7 shows the housing leg of the seat belt retractor with a blocking device arranged therein in a partial sectional side view before loading of the belt shaft.

From FIG. 7, the cooperation of the blocking device shown in FIGS. 2 through 6 with the toothing formed in the housing leg 12 of the seat belt retractor housing 11 can be seen, whereby the housing leg 12 of the seat belt retractor housing 11 has corresponding bearing openings 35 for supporting the belt shaft 13. An edge of housing leg 12 surrounds the bearing openings 35. This edge of the housing leg 12 that is intended for blocking the belt shaft 13 forms the corresponding toothing 32 in the plane of the housing leg 12. In this regard, it can be seen from FIG. 7 that based on the action of the plate spring 30, the blocking element 22 is held in engagement with the toothing 32. If the belt shaft is rotated in the tensioning direction, that is, clockwise in FIG. 7, then the correspondingly arranged tooth flanks of the toothing 32, as well as also the teeth 23 of the blocking element 22 guide the blocking element 22 against the prestressing of the plate spring 30 into the recess of the shaft body 20, so that the blocking element 22, ratchets away with its teeth 23 over the toothing 32 of the housing leg 12.

If the rotational direction of the belt shaft is reversed after completion of the tensioning process by tension on the belt band 14 (FIG. 1) (counterclockwise), then a blocking of the belt shaft 13 or the shaft body 20 takes place based on the constant engagement of the teeth 23 of the blocking element in the toothing 32, whereby the blocking element 22 braces with its pocket 26 on the curved region 25a of the shaft nose 25 and this shaft nose 25 bends into the interior of the shaft body 20. In this manner, on the one hand the ends of the shaft nose 25 with the curved region 25a move into the pocket 26, so that the freedom of movement between the blocking element 22 and the shaft body 20 are defined. In addition, a radial support of the shaft body 20 in the counterclockwise direction occurs, so that in particular in the circumferential region opposite to the shaft nose 25, the toothing 32 moves in engagement with the recesses 24 of the shaft body 20 shown in FIG. 7 and here, serves to additionally fix the shaft body 20.

Figure 8:
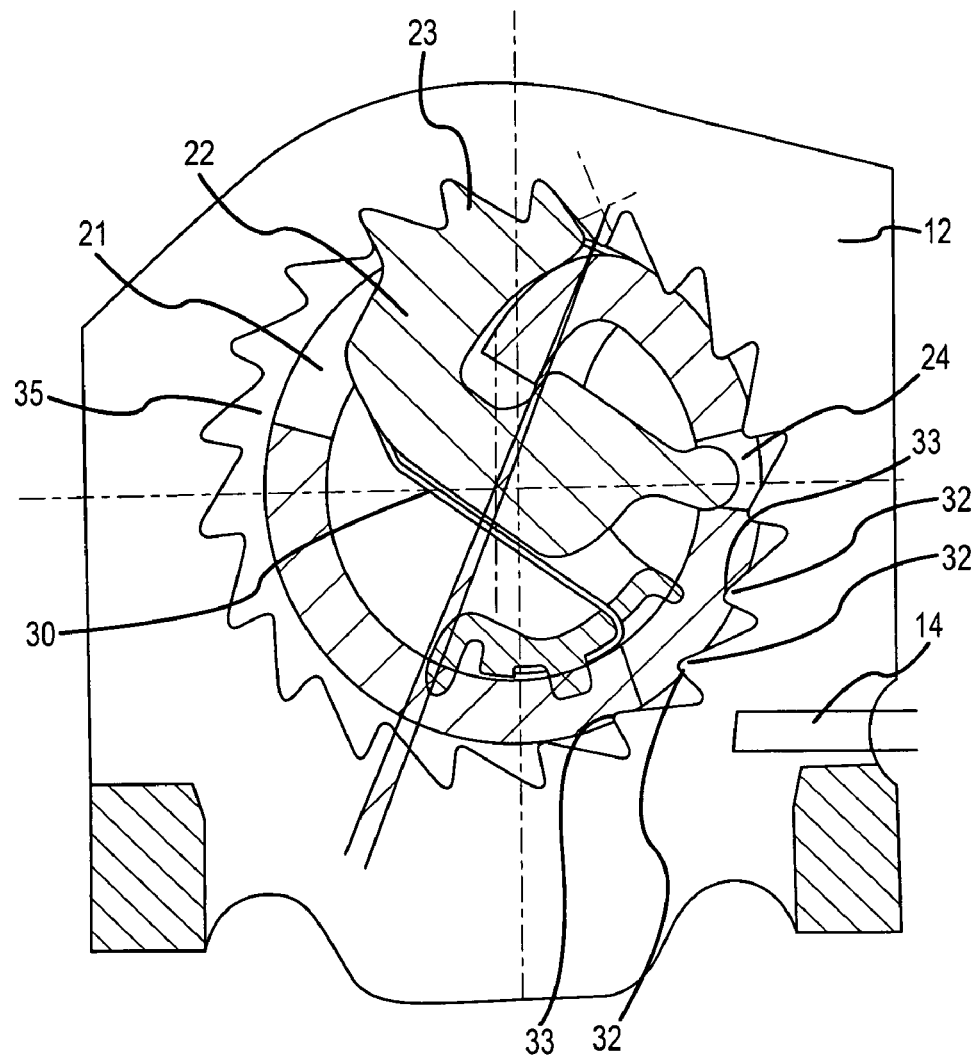
FIG. 8 shows the subject matter of FIG. 7 during loading of the belt shaft.

This blocking position is shown in FIG. 8, whereby instead of the recesses 24, blocking pleats 33 are provided as blocking contours along the circumference of the shaft body 20, which the toothing 32 of the housing leg 12 positively engage.

In this manner, a secure blocking of the shaft belt 13 on the seat belt retractor housing 11 is provided in the event of load.

The features of the subject matter of this specification disclosed in the previous description, in the patent claims, the abstract, and the figures can be used individually as well as in any combination for implementation of the invention in its various embodiments.

The specification incorporates by reference the disclosure of German priority document 103 04 943.6 filed Feb. 6, 2003 and PCT/EP2004/000761.

The present invention is, of course, in no way restricted to the specific disclosure of the specification and drawings, but also encompasses any modifications within the scope of the appended claims.

The invention claimed is:

1. A restraint system for a vehicle, comprising:
   a seat belt;
   an end fitting for an end of the seat belt with a tensioning device, wherein the end of the seat belt can be attached by means of the end fitting to a body of the vehicle, wherein the end fitting comprises a seat belt retractor with a housing that takes up the end of a seat belt and the tensioning device connected to the seat belt retractor for a belt shaft of the seat belt retractor, wherein the belt shaft is formed as a hollow shaft;
   a blocking element for blocking the belt shaft that is released in the event of an accident, wherein a hollow shaft body of the belt shaft extends through a housing leg of the seat belt retractor housing and has a recess in the plane of the housing leg,
   wherein the blocking element is pivotably arranged in an interior of the hollow shaft body, and projects through the recess with at least one tooth beyond an outer periphery of the shaft body and is prestressed by a spring element positioned in the interior of the shaft body, into engagement in a toothing formed on the housing leg of the seat belt retractor housing, wherein the blocking element is formed so that it ratchets away over the toothing upon rotation of the belt shaft in a tensioning direction, wherein on an outer circumference of the shaft body, a blocking contour disposed for engagement in the toothing of the seat belt retractor housing is formed directly in the shaft body, and wherein during rotation of the belt shaft in a pull-out direction of the seat belt that takes place after completion of the tensioning movement, the blocking element effects an immediate blocking of the belt shaft.

2. The restraint system of claim 1, wherein the blocking element is supported with a bearing shoulder in a through hole of the shaft body, wherein the blocking element is braced in an engaged state with the toothing of the seat belt retractor housing on an edge region of the recess, and wherein the recess is formed as a shaft nose.

3. The restraint system of claim 1 wherein a plurality of blocking contours is arranged over the circumference of the shaft body.

4. The restraint system of claim 1 wherein the blocking contour is formed as a recess in the shaft body.

5. The restraint system of claim 1 wherein the blocking contour comprises a blocking pleat pressed into the shaft body.

6. The restraint system of claim 1, wherein the blocking element is prestressed by means of a plate spring fixed in the interior of the shaft body, wherein said shaft body is engaged with the toothing of the seat belt retractor housing upon engagement of the blocking element with the toothing of the seat belt retractor.

7. The restraint system of claim 1, wherein for symmetrical blocking of the belt shaft, one blocking element is arranged respectively in the plane of the housing leg of the seat belt retractor housing supporting the belt shaft in the shaft body and a toothing is formed, respectively, on the housing leg of the seat belt retractor housing.

8. The restraint system of claim 1, wherein the shaft body is formed as a shaft jacket in the form of a flat pre-cut part that is formed into a roller.

9. The restraint system of claim 2, wherein the recess has a type of extension in the circumferential direction of the shaft body, such that the blocking element can plunge into the recess with its tooth upon over-ratcheting of the toothing of the seat belt retractor housing.

10. The restraint system of claim 8, wherein the shaft jacket comprises a thin sheet steel.

* * * * *